United States Patent
Choyi et al.

(10) Patent No.: US 12,368,599 B2
(45) Date of Patent: Jul. 22, 2025

(54) SYSTEMS AND METHODS FOR SECURE POLICY MESSAGING

(71) Applicant: Verizon Patent and Licensing Inc., Basking Ridge, NJ (US)

(72) Inventors: Vinod Kumar Choyi, Conshohocken, PA (US); Shanthala Kuravangi-Thammaiah, Keller, TX (US); Yousif Targali, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 166 days.

(21) Appl. No.: 18/354,281

(22) Filed: Jul. 18, 2023

(65) Prior Publication Data
US 2025/0030554 A1    Jan. 23, 2025

(51) Int. Cl.
H04L 9/32    (2006.01)
H04L 9/08    (2006.01)

(52) U.S. Cl.
CPC .......... H04L 9/3242 (2013.01); H04L 9/0822 (2013.01)

(58) Field of Classification Search
CPC ... H04L 9/3242; H04L 9/0822; H04L 9/0819; H04W 12/04; H04W 12/041; H04W 12/0431; H04W 12/033; H04W 12/106; H04W 64/00; H04W 12/0433
See application file for complete search history.

(56) References Cited

U.S. PATENT DOCUMENTS

| | | | | |
|---|---|---|---|---|
| 11,228,562 B2* | 1/2022 | Saarinen | ............... | H04W 12/75 |
| 11,617,075 B2* | 3/2023 | Tang | .................... | H04W 60/00 |
| | | | | 713/150 |
| 12,256,005 B2* | 3/2025 | Li | ........................... | H04L 9/321 |
| 2020/0229120 A1* | 7/2020 | Tiwari | ................... | H04W 60/02 |
| 2021/0084489 A1* | 3/2021 | Tang | ................... | H04W 12/037 |
| 2022/0167157 A1* | 5/2022 | Tiwari | ................. | H04L 9/3242 |
| 2023/0019089 A1* | 1/2023 | Li | .......................... | H04L 9/0866 |
| 2023/0232236 A1* | 7/2023 | Balmakhtar | ........ | H04W 12/102 |
| | | | | 455/411 |
| 2023/0354013 A1* | 11/2023 | Li | ......................... | H04W 12/02 |
| 2024/0040375 A1* | 2/2024 | Gundavelli | ......... | H04L 61/4511 |

* cited by examiner

Primary Examiner — Techane Gergiso (57) ABSTRACT

In some implementations, a policy control function (PCF) device may receive a PCF device key uniquely associated with a user equipment (UE). The PCF device may generate an integrity key and an encryption key based on the PCF device key and an identifier of the PCF device. The PCF device may generate, based on the integrity key, integrity data associated with policy information related to the UE. The PCF device may encrypt, based on the encryption key, the policy information to generate encrypted policy information. The PCF device may send, for the UE, a UE policy message indicating the integrity data, the encrypted policy information, and the identifier of the PCF device.

20 Claims, 6 Drawing Sheets

SYSTEMS AND METHODS FOR SECURE POLICY MESSAGING

BACKGROUND

In a wireless network, a policy control function (PCF) device provides policy information for a user equipment (UE). For example, the PCF device may provide UE route selection policy (URSP) information for the UE.

DETAILED DESCRIPTION OF EXAMPLE EMBODIMENTS

The following detailed description of example implementations refers to the accompanying drawings. The same reference numbers in different drawings may identify the same or similar elements.

A user equipment (UE) may use policy information, such as UE route selection policy (URSP) information, to perform one or more operations and/or procedures. For example, the URSP information may include one or more traffic descriptors and/or one or more route selection descriptors, among other examples, that enable the UE to determine how to route outgoing traffic (e.g., to connect the outgoing traffic to appropriate protocol data unit (PDU) sessions).

The traffic descriptors may be used to identify traffic associated with an application, such as a flow of traffic associated with the application. As an example, the traffic descriptors may include application descriptors (e.g., an operating system (OS) identifier (OSId) and/or an OS application identifier (OSAppId)), internet protocol (IP) descriptors (e.g., an IP address, IP version 6 (IPv6) network prefix, port number, protocol ID, security parameter index type, type of service, type of traffic class type, and/or flow label type), domain descriptors (e.g., destination fully qualified domain names (FQDNs) and/or a regular expression as a domain name matching criteria), non-IP descriptors, data network names (DNNs), and/or connection capabilities. The UE may use the traffic descriptors to identify an application and/or an application type, such as a streaming video application and/or a productivity application, among other examples.

The one or more route selection descriptors may include information for establishing a data session for an application and/or for routing traffic associated with the application. As an example, the one or more route selection descriptors may include session and service continuity (SSC) mode information, network slice selection information, data network (DN) information, PDU session type selection information, non-seamless offload indication information, access type preference information, location criteria type information, and/or time window type information.

Accordingly, the UE may use the URSP information to determine whether traffic associated with an application can be sent on an established PDU session, can be offloaded to non-3rd Generation Partnership Project (non-3GPP) access outside a PDU session, and/or can be used to trigger the establishment of a new PDU session.

To provision the UE with the URSP information, one or more network devices (e.g., associated with a wireless network) may interact with one another. As an example, a policy control function (PCF) device may send, and an access and mobility management function (AMF) device may receive, a UE policy message indicating the URSP information. The AMF device may forward (e.g., using non-access stratum (NAS) signaling) the UE policy message to the UE (e.g., via a base station), and the UE may use the URSP information indicated by the UE policy message to perform one or more operations and/or procedures.

The PCF device and the AMF device typically provide the UE policy message to the UE without protection (e.g., without performing integrity and encryption techniques associated with the UE policy message and/or the URSP information indicated by the UE policy message). As a result, security vulnerabilities may arise when the PCF device provides (e.g., via the AMF device) the UE policy message (e.g., indicating the URSP information) for the UE.

As an example, the AMF device may be subject to an attack (e.g., a malicious or non-malicious attack) that prevents the UE policy message and/or the URSP information indicated by the UE policy message from reaching the UE and/or enables unauthorized modifications to be made to the UE policy message and/or the URSP information indicated by the UE policy message. As a result, the UE may apply stale (e.g., invalid), inaccurate, incorrect, and/or compromised URSP information, which increases a risk of security vulnerabilities and/or causes quality of service (QOS) issues associated with the UE. This may lead to the UE being unable to correctly route traffic that is generated by the UE.

For example, the UE can be associated with one or more applications (e.g., applications installed on the UE and/or applications used and/or accessed by the UE, among other examples), and the UE can be unable to select particular network slices and/or can select incorrect network slices (e.g., less secure network slices), of the wireless communication network, through which to route traffic that is associated with the one or more applications. As a result, the UE can experience an increase in latency associated with the one or more applications, can experience a decrease in throughput of the traffic associated with the one or more applications, can experience delayed and/or dropped traffic associated with the one or more applications, and/or can experience degraded security associated with one or more applications (e.g., caused by degraded encryption using a lower strength algorithm and/or shorter key sizes), among other examples, which in turn can cause a degraded user experience associated with the one or more applications.

Some implementations described herein enable secure policy messaging (e.g., a network device may securely provide URSP information for a UE, as described in more detail elsewhere herein). For example, a PCF device may send, and an authentication server function (AUSF) device may receive, a request for a PCF device key uniquely associated with a UE. The PCF device key may be derived (e.g., by the AUSF device and/or another device, among other examples) from a master session key that is associated with the UE. The AUSF device may send, and the PCF device may receive, the PCF device key responsive to the request for the PCF device key. The PCF device may generate an integrity key and an encryption key based on the PCF device key and an identifier of the PCF device. The PCF device may use the integrity key to generate integrity data and/or may use the encryption key to generate encrypted data associated with data that the PCF provides for the UE, as described in more detail elsewhere herein.

As an example, the PCF device may generate, based on the integrity key, integrity data associated with policy information (e.g., related to the UE). The PCF device may encrypt, based on the encryption key, the policy information to generate encrypted policy information. The PCF device may send, for the UE, a UE policy message indicating the integrity data, the encrypted policy information, and the identifier of the PCF device (e.g., the PCF device may send the UE policy message to an AMF device, and the AMF device may forward the UE policy message to the UE via a base station). The PCF may indicate if the message has been integrity protected and/or encrypted and/or may indicate the PCF identifier to be used for generating the keys.

In some implementations, the UE may generate, based on the master session key and the identifier of the PCF device, the PCF device key uniquely associated with the UE. The UE may generate, based on the PCF device key and the identifier of the PCF device, the integrity key and an encryption key. The UE may generate, based on the integrity key, second integrity data. The UE may compare the first integrity data and the second integrity data to determine whether the first integrity data matches the second integrity data. The UE may decrypt, based on determining that the first integrity data matches the second integrity data and by using the encryption key, the encrypted policy information to generate decrypted policy information associated with the UE. The UE may apply the decrypted policy information.

In this way, some implementations described herein provide secure policy messaging (e.g., secure URSP information messaging). For example, the PCF device can use the integrity key to generate integrity data and/or can use the encryption key to encrypt the policy information) rather than another device (e.g., the policy information does not need to be transmitted to another device to be protected before being sent for the UE). Additionally, the UE can validate the policy information (e.g., because the UE can generate the integrity key) and/or can decrypt the encrypted policy information (e.g., because the UE can generate the encryption key). This enhances security associated with the PCF device providing policy information for the UE.

Figure 1A:
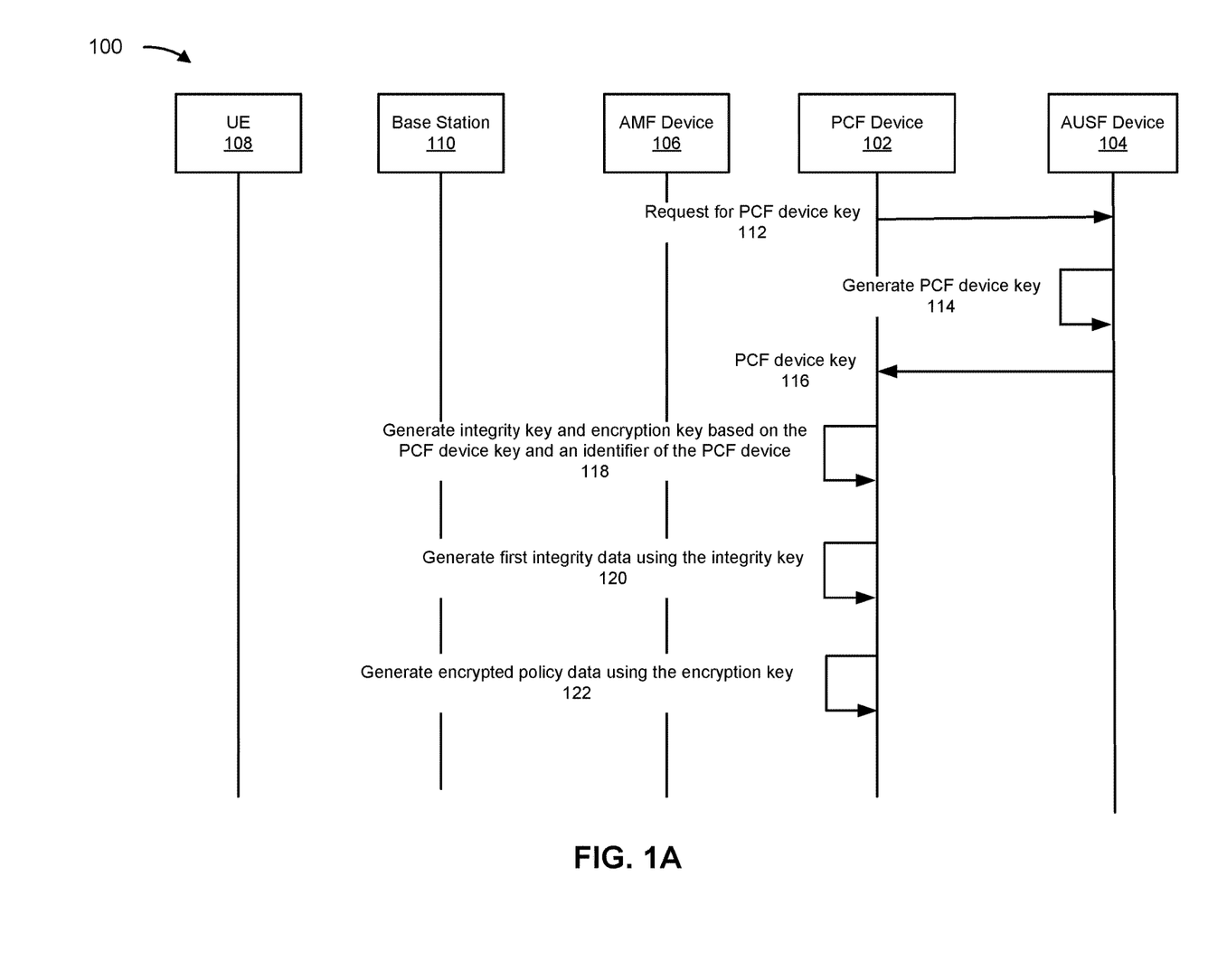
FIGS. 1A-1B are diagrams of an example associated with secure policy messaging.
Figure 1B:
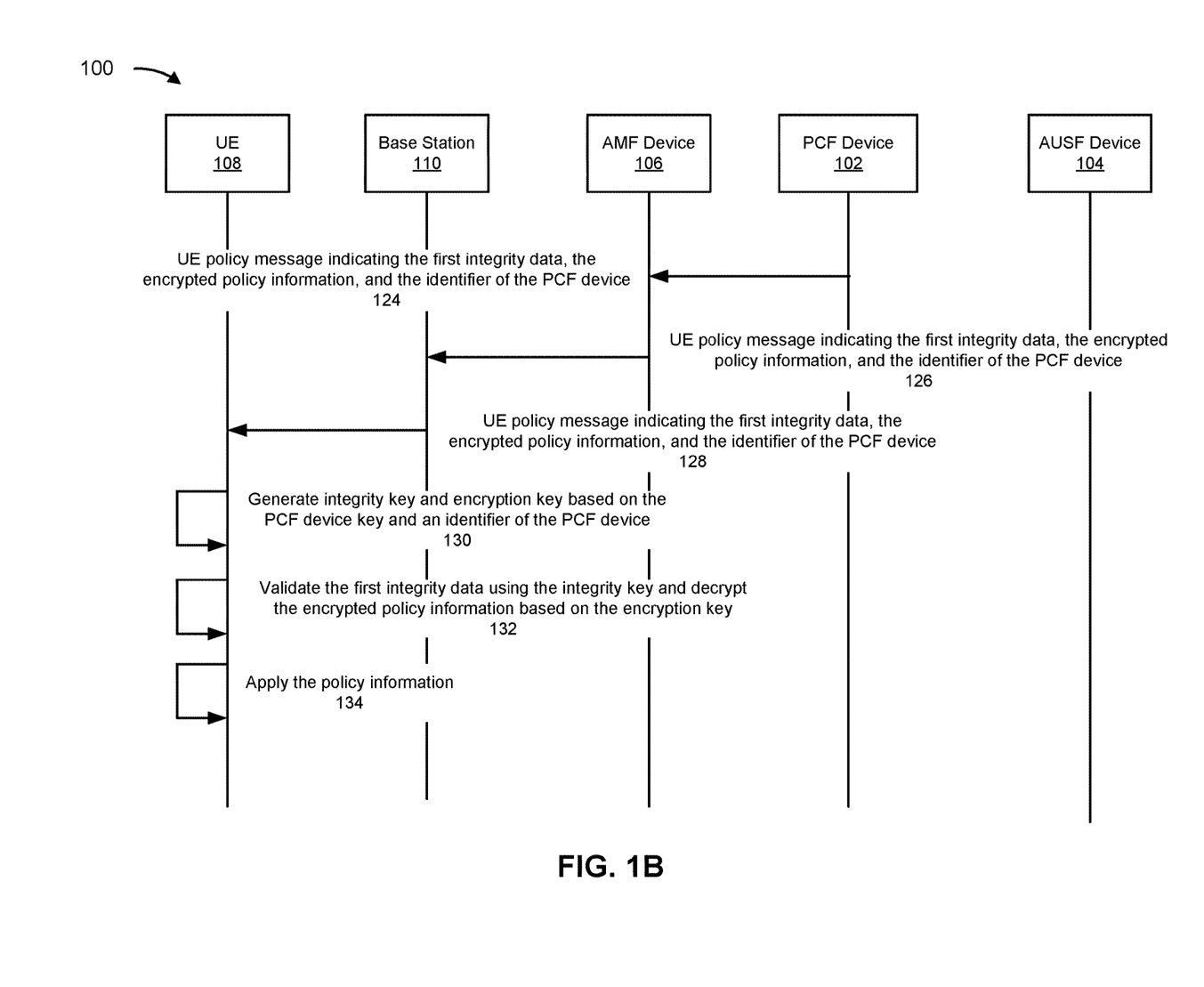

FIGS. 1A-1B are diagrams of an example 100 associated with secure policy messaging. As shown in FIGS. 1A-1B, example 100 includes a PCF device 102, an AUSF device 104, an AMF device 106, a UE 108, and a base station 110.

As shown in FIG. 1A, and by reference number 112, the PCF device 102 may transmit, and the AUSF device 104 may receive, a request for a PCF device key (KPCF) that is uniquely associated with the UE 108. In some implementations, the PCF device key request may indicate an identifier of the UE 108 (e.g., a subscription permanent identifier (SUPI) or a subscription concealed identifier (SUCI)) and an identifier of the PCF device 102, also referred to as PCF-Id.

As further shown in FIG. 1A, and by reference number 114, the AUSF device 104 may generate the PCF device key (e.g., that is uniquely associated with the UE 108 indicated by the PCF device key request). As an example, the AUSF device 104 may derive the PCF device key from a master session key, also referred to as KAUSF, associated with the UE (e.g., that is stored by the AUSF device 104).

As further shown in FIG. 1A, and by reference number 116, the AUSF device 104 may transmit, and the PCF device 102 may receive, the PCF device key uniquely associated with the UE 108. As an example, the AUSF device 104 may transmit, and the PCF device 102 may receive, the PCF device key responsive to the PCF device key request (e.g., that was transmitted by the PCF device 102). In some implementations, the AUSF device 104 may send the PCF device key only to an authorized PCF device 102 (e.g., the PCF device 102 that serves the UE that is uniquely associated with the PCF device key), which enhances security associated with the PCF device 102 providing policy information for the UE 102.

As further shown in FIG. 1A, and by reference number 118, the PCF device 102 may generate an integrity key, also referred to as KPCF-INT, and an encryption key, also referred to as KPCF-ENC, based on the PCF device key and the identifier of the PCF device. As an example, the PCF device 102 may generate the integrity key and/or the encryption key based on the PCF device key and the PCF identifier. In some instances, the integrity key and/or the encryption key may be generated using one or more randomization techniques (e.g., by using a pseudo-random value as one of the inputs along with the PCF device key and/or the PCF identifier). The PCF device 102 may use the integrity key to generate first integrity data and/or may use the encryption key to generate encrypted policy information associated with the UE, as described in more detail elsewhere herein.

As further shown in FIG. 1A, and by reference number 120, the PCF device 102 may generate the first integrity data using the integrity key. As an example, the PCF device 102 may generate a message authentication code (MAC) using the integrity key. In some implementations, the PCF device 102 may include the first integrity data in a UE policy message (e.g., to be provided for the UE 108), which may be used to ensure that the information included in the UE policy message is authentic, as described in more detail elsewhere herein. Although the first integrity data is described in connection with FIG. 1A and reference number 120 as being a MAC, the first integrity data may be any suitable integrity data.

As further shown in FIG. 1A, and by reference number 122, the PCF device 102 may generate encrypted policy information. For example, the PCF device 102 may encrypt, using the encryption key, the policy information to generate the encrypted policy information. In some implementations, the PCF device 102 may include the encrypted policy information in the UE policy message (e.g., to be provided for the UE 108), which may be used to ensure that the information included in the UE policy message remains confidential when being provided for the UE 108, as described in more detail elsewhere herein.

As shown in FIG. 1B, and by reference number 124, the PCF device 102 may transmit, and the AMF device 106 may receive, the UE policy message indicating the first integrity data, the encrypted policy information, and the identifier of the PCF device 102. In some implementations, the PCF device 102 may transmit, and the AMF device 106 may receive, the UE policy message to provision the UE 108 with the policy information. As an example, if the PCF device 102 determines to provision the UE 108 with URSP information, then the PCF device 102 may generate a MAC, may encrypt the URSP information to generate encrypted URSP information, and may include the MAC and the encrypted URSP information in a UE policy message. The PCF device 102 may provide the UE policy message for the UE 108, as described in more detail elsewhere herein.

As further shown in FIG. 1B, and by reference number 126, the AMF device 106 may transmit, and the base station 110 may receive, the UE policy message. For example, the AMF device 106 may forward the UE policy message to the base station 110 based on receiving the UE policy message from the PCF device 102. As further shown in FIG. 1B, and by reference number 128, the base station 110 may transmit, and the UE 108 may receive, the UE policy message. For example, the base station 110 may forward the UE policy message to the UE 108 based on receiving the UE policy message from the AMF device 106.

As further shown in FIG. 1B, and by reference number 130, the UE 108 may generate the integrity key (e.g., in a similar manner that the PCF generates the integrity key, as described in connection with FIG. 1A and reference number 118 and/or as described in more detail elsewhere herein) and the encryption key (e.g., in a similar manner that the PCF generates the integrity key, as described in connection with FIG. 1A and reference number 118 and/or as described in more detail elsewhere herein) based on the PCF device key and the identifier of the PCF device.

As further shown in FIG. 1B, and by reference number 132, the UE 108 may validate the first integrity data using the integrity key and may decrypt the encrypted policy information using the encryption key. As an example, the UE 108 may generate, based on the integrity key, second integrity data. The UE 108 may compare the first integrity data and the second integrity data to determine whether the first integrity data matches the second integrity data. The UE 108 may decrypt, based on determining that the first integrity data matches the second integrity data and by using the encryption key, the encrypted policy information to generate decrypted policy information associated with the UE.

As shown in FIG. 1B, and by reference number 134, the UE 108 may apply the policy information. In some implementations, the UE 108 may send the outgoing traffic associated with the UE over a packet data unit (PDU) session based on applying the policy information. As an example, if the UE policy message includes URSP information associated with routing traffic associated with an application executing on the UE 108 to an established PDU session, then the UE 108 may use the URSP information to route the traffic associated with the application to the established PDU session.

In this way, some implementations described herein provide secure policy messaging (e.g., secure URSP information messaging). For example, the PCF device 102 can use the integrity key to generate integrity data and/or can use the encryption key to encrypt the policy information) rather than another device (e.g., the policy information does not need to be transmitted to another device to be protected before being sent for the UE). Additionally, the UE 108 can validate the policy information (e.g., because the UE 108 can generate the integrity key) and/or can decrypt the encrypted policy information (e.g., because the UE 108 can generate the encryption key). This enhances security associated with the PCF device 102 providing policy information for the UE 108.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
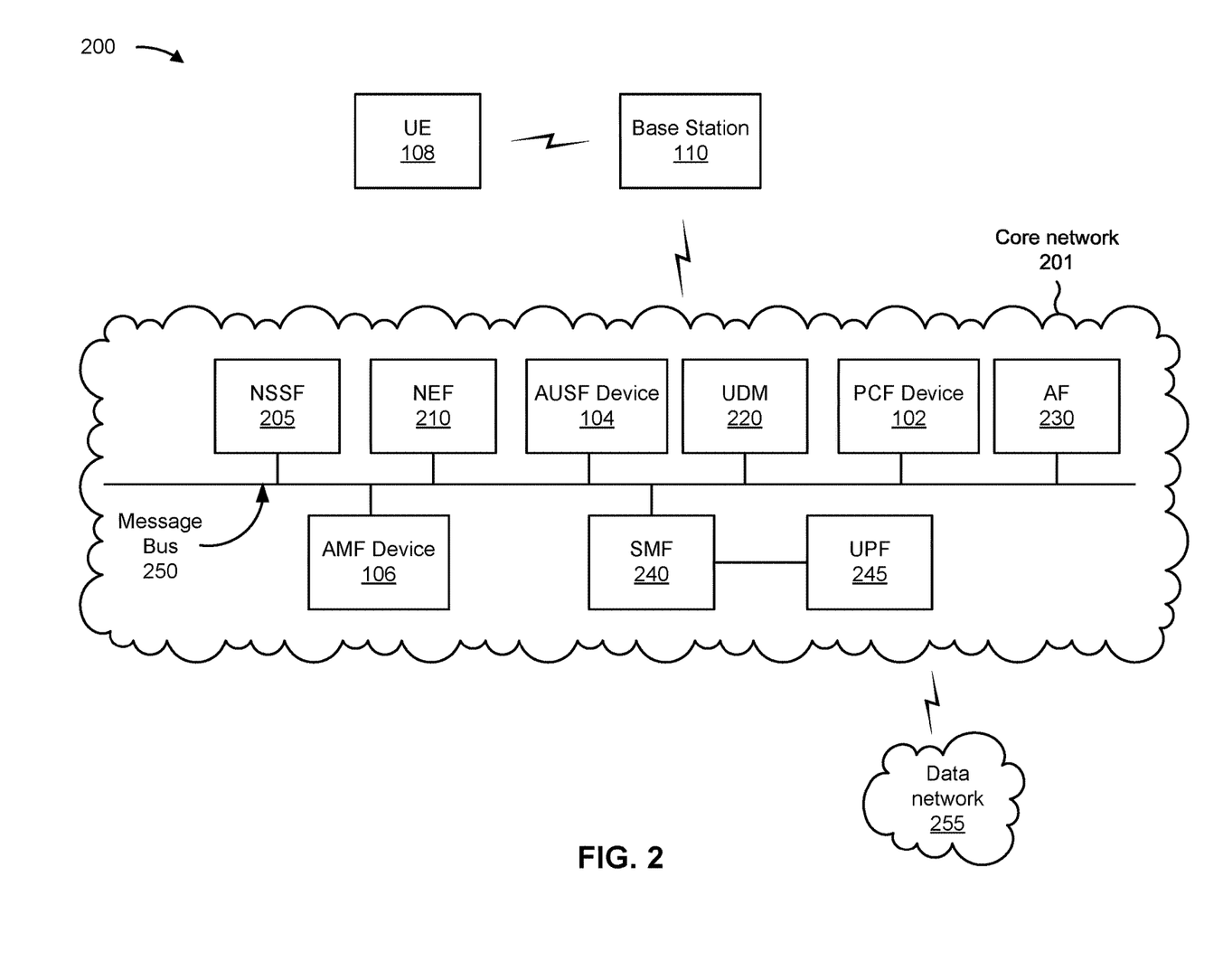
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 108, a base station 110, a core network 201, and a data network 255. Devices and/or networks of example environment 200 may interconnect via wired connections, wireless connections, or a combination of wired and wireless connections.

UE 108 includes one or more devices capable of receiving, generating, storing, processing, and/or providing information, such as information described herein. For example, UE 108 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

Base station 110 include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices). Base station 110 may be included in a radio access network (RAN) that may support, for example, a cellular radio access technology (RAT). The RAN may include one or more base stations (e.g., base transceiver stations, radio base stations, node Bs, eNBs, gNBs, base station subsystems, cellular sites, cellular towers, access points, TRPs, radio access nodes, macrocell base stations, microcell base stations, picocell base stations, femtocell base stations, or similar types of devices) and other network entities that can support wireless communication for UE 108. The RAN may transfer traffic between UE 108 (e.g., using a cellular RAT), one or more base stations (e.g., using a wireless interface or a backhaul interface, such as a wired backhaul interface), and/or core network 201. The RAN may provide one or more cells that cover geographic areas.

In some implementations, the RAN may perform scheduling and/or resource management for UE 108 covered by the RAN (e.g., UE 108 covered by a cell provided by the RAN). In some implementations, the RAN may be controlled or coordinated by a network controller, which may perform load balancing, network-level configuration, and/or other operations. The network controller may communicate with the RAN via a wireless or wireline backhaul. In some implementations, the RAN may include a network controller, a self-organizing network (SON) module or component, or a similar module or component. In other words, the RAN may perform network control, scheduling, and/or network management functions (e.g., for uplink, downlink, and/or sidelink communications of UE 108 covered by the RAN).

In some implementations, core network 201 may include an example functional architecture in which systems and/or methods described herein may be implemented. For example, core network 201 may include an example architecture of a fifth generation (5G) next generation (NG) core network included in a 5G wireless telecommunications system. While the example architecture of core network 201 shown in FIG. 2 may be an example of a service-based architecture, in some implementations, core network 201 may be implemented as a reference-point architecture and/or a 4G core network, among other examples.

As shown in FIG. 2, core network 201 may include a number of functional elements. The functional elements may include, for example, a PCF device 102, an AUSF device 104, an AMF device 106, a network slice selection function (NSSF) 205, a network exposure function (NEF) 210, a unified data management (UDM) component 220, an application function (AF) 230, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment. PCF device 102 includes one or more devices that provide a policy framework that incorporates network slicing, roaming, packet processing, and/or mobility management, among other examples.

AUSF device 104 includes one or more devices that act as an authentication server and support the process of authenticating UE 108 in the wireless telecommunications system.

AMF device 106 includes one or more devices that act as a termination point for non-access stratum (NAS) signaling and/or mobility management, among other examples.

NSSF 205 includes one or more devices that select network slice instances for UE 108. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

UDM 220 includes one or more devices that store user data and profiles in the wireless telecommunications system. UDM 220 may be used for fixed access and/or mobile access in core network 201.

AF 230 includes one or more devices that support application influence on traffic routing, access to NEF 210, and/or policy control, among other examples.

SMF 240 includes one or more devices that support the establishment, modification, and release of communication sessions in the wireless telecommunications system. For example, SMF 240 may configure traffic steering policies at UPF 245 and/or may enforce user equipment IP address allocation and policies, among other examples.

UPF 245 includes one or more devices that serve as an anchor point for intra-RAT and/or inter-RAT mobility. UPF 245 may apply rules to packets, such as rules pertaining to packet routing, traffic reporting, and/or handling user plane QoS, among other examples.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
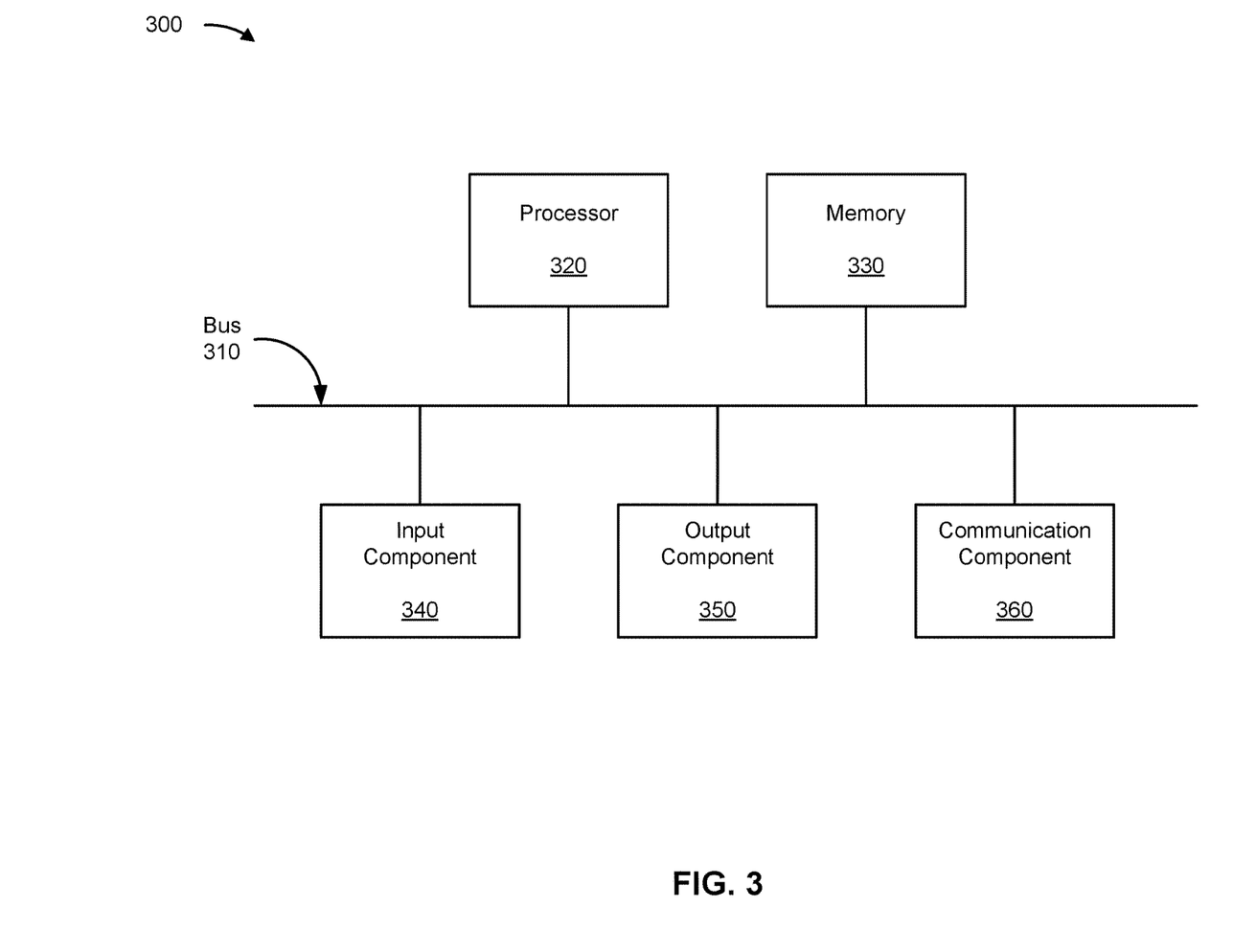
FIG. 3 is a diagram of example components of a device associated with secure policy messaging.

FIG. 3 is a diagram of example components of a device 300 associated with secure policy messaging. The device 300 may correspond to the PCF device 102, the AUSF device 104, the AMF device 106, the UE 108, the base station 110, the NSSF 205, the NEF 210, the UDM 220, the AF 230, the SMF 240, and/or the UPF 245. In some implementations, the PCF device 102, the AUSF device 104, the AMF device 106, the UE 108, the base station 110, the NSSF 205, the NEF 210, the UDM 220, the AF 230, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
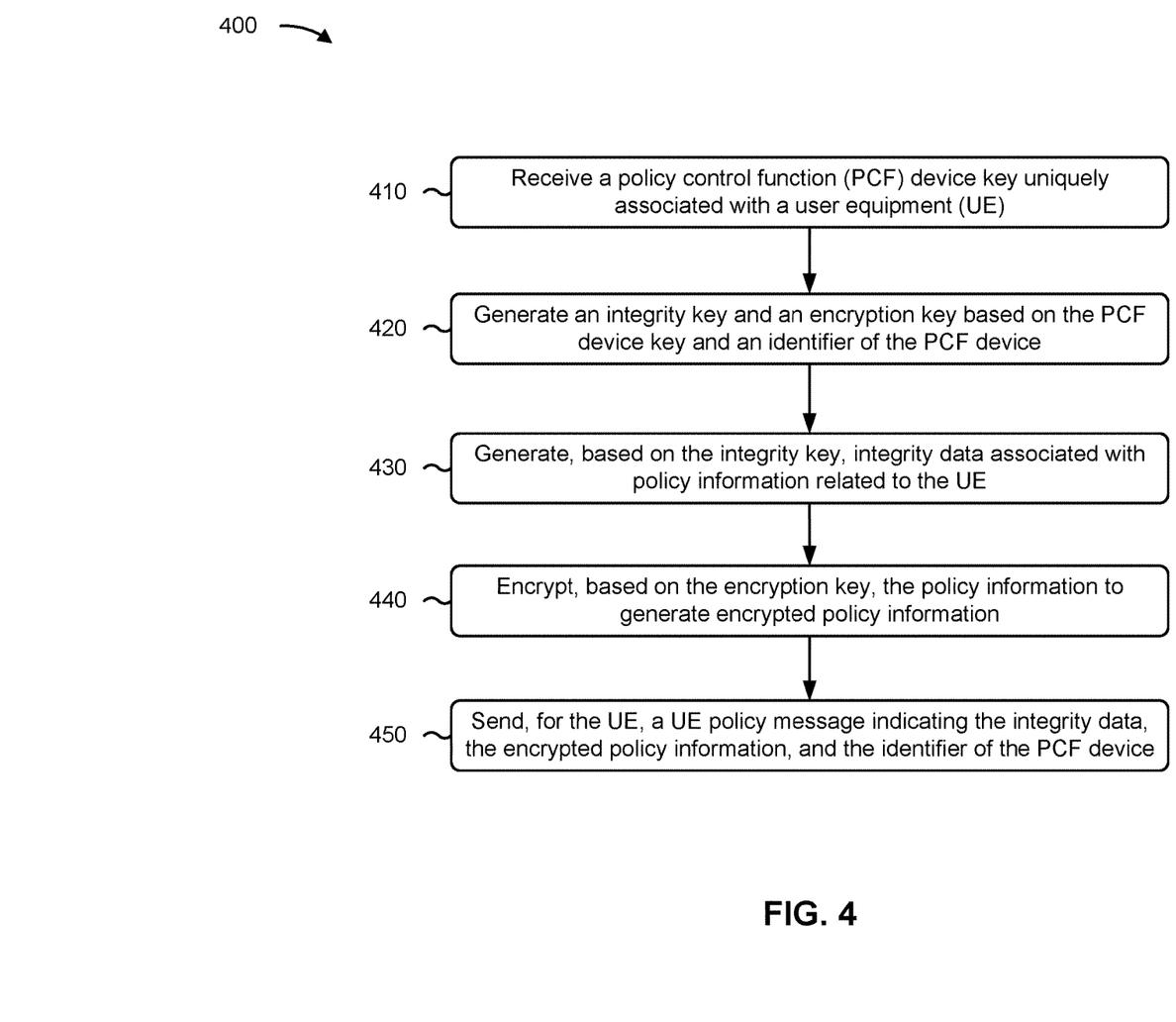
FIG. 4 is a flowchart of an example process associated with secure policy messaging.

FIG. 4 is a flowchart of an example process 400 associated with secure policy messaging. In some implementations, one or more process blocks of FIG. 4 may be performed by a PCF device (e.g., PCF device 102). In some implementations, one or more process blocks of FIG. 4 may be performed by another device or a group of devices separate from or including the PCF device, such as an AUSF device (e.g., AUSF device 104), an AMF device (e.g., AMF device 106), a UE (e.g., UE 108), a base station (e.g., base station 110), an NSSF (e.g., NSSF 205), an NEF (e.g., NEF 210), a UDM (e.g., UDM 220), an AF (e.g., AF 230), an SMF (e.g., SMF 240), and/or a UPF (e.g., UPF 245). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a PCF device key uniquely associated with a UE (block 410). For example, the PCF device may receive a PCF device key uniquely associated with the UE, as described above. In some implementations, the UE may be associated with a master session key. The PCF device key uniquely associated with the UE may be derived from the master session key associated with the UE. The PCF device key may be received from an AUSF device. In some implementations, the PCF device may be an authorized PCF device associated with the UE.

As further shown in FIG. 4, process 400 may include generating an integrity key and an encryption key based on the PCF device key and an identifier of the PCF device (block 420). For example, the PCF device may generate an integrity key and an encryption key based on the PCF device key and an identifier of the PCF device, as described above.

As further shown in FIG. 4, process 400 may include generating, based on the integrity key, integrity data associated with policy information related to the UE (block 430). For example, the PCF device may generate, based on the integrity key, integrity data associated with policy information related to the UE, as described above. As an example, the integrity data may be an MAC. In some implementations, the policy information is URSP information associated with the UE.

As further shown in FIG. 4, process 400 may include encrypting, based on the encryption key, the policy information to generate encrypted policy information (block 440). For example, the PCF device may encrypt, based on the encryption key, the policy information to generate encrypted policy information, as described above.

As further shown in FIG. 4, process 400 may include sending, for the UE, a UE policy message indicating the integrity data, the encrypted policy information, and the identifier of the PCF device (block 450). For example, the PCF device may send, for the UE, a UE policy message indicating the integrity data, the encrypted policy information, and the identifier of the PCF device, as described above. As an example, the UE policy message may be sent to an AMF device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
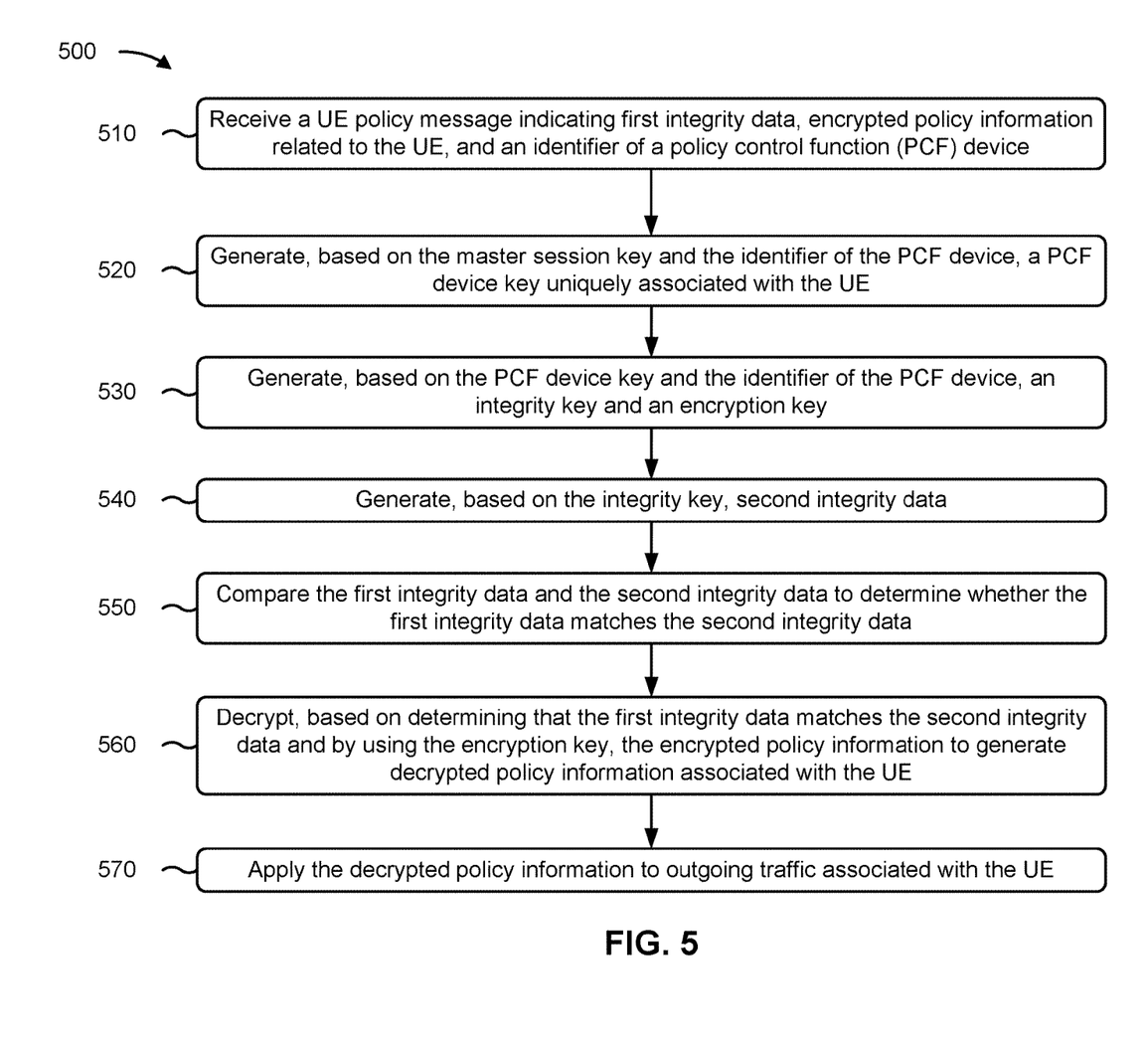
FIG. 5 is a flowchart of an example process associated with secure policy messaging.

FIG. 5 is a flowchart of an example process 500 associated with secure policy messaging. In some implementations, one or more process blocks of FIG. 5 may be performed by a UE (e.g., UE 108). In some implementations, one or more process blocks of FIG. 5 may be performed by another device or a group of devices separate from or including the UE, such as a PCF device (e.g., PCF device 102), an AUSF device (e.g., AUSF device 104), an AMF device (e.g., AMF device 106), a base station (e.g., base station 110), an NSSF (e.g., NSSF 205), an NEF (e.g., NEF 210), a UDM (e.g., UDM 220), an AF (e.g., AF 230), an SMF (e.g., SMF 240), and/or a UPF (e.g., UPF 245). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving a UE policy message indicating first integrity data, encrypted policy information related to the UE, and an identifier of a PCF device (block 510). For example, the UE may receive a UE policy message indicating first integrity data, encrypted policy information related to the UE, and an identifier of a PCF device, as described above. In some implementations, the UE is associated with a master session key.

As further shown in FIG. 5, process 500 may include generating, based on the master session key and the identifier of the PCF device, a PCF device key uniquely associated with the UE (block 520). For example, the UE may generate, based on the master session key and the identifier of the PCF device, a PCF device key uniquely associated with the UE, as described above. As an example, the PCF device may be an authorized PCF device associated with the UE.

As further shown in FIG. 5, process 500 may include generating, based on the PCF device key and the identifier of the PCF device, an integrity key and an encryption key (block 530). For example, the UE may generate, based on the PCF device key and the identifier of the PCF device, an integrity key and an encryption key, as described above.

As further shown in FIG. 5, process 500 may include generating, based on the integrity key, second integrity data (block 540). For example, the UE may generate, based on the integrity key, second integrity data, as described above. In some implementations, the first integrity code and the second integrity code may be associated with an MAC.

As further shown in FIG. 5, process 500 may include comparing the first integrity data and the second integrity data to determine whether the first integrity data matches the second integrity data (block 550). For example, the UE may compare the first integrity data and the second integrity data to determine whether the first integrity data matches the second integrity data, as described above.

As further shown in FIG. 5, process 500 may include decrypting, based on determining that the first integrity data matches the second integrity data and by using the encryption key, the encrypted policy information to generate decrypted policy information associated with the UE (block 560). For example, the UE may decrypt, based on determining that the first integrity data matches the second integrity data and by using the encryption key, the encrypted policy information to generate decrypted policy information associated with the UE, as described above. In some implementations, the encrypted policy information may be encrypted URSP information associated with the UE.

As further shown in FIG. 5, process 500 may include applying the decrypted policy information to outgoing traffic associated with the UE (block 570). For example, the UE may apply the decrypted policy information to outgoing traffic associated with the UE, as described above. In some implementations, the UE policy message is associated with an application executing on the UE. In some implementations, process 500 includes sending the outgoing traffic associated with the UE over a PDU session based on the decrypted policy information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a policy control function (PCF) device, a PCF device key uniquely associated with a user equipment (UE);
   generating, by the PCF device, an integrity key and an encryption key based on the PCF device key and an identifier of the PCF device;
   generating, by the PCF device and based on the integrity key, integrity data associated with policy information related to the UE;
   encrypting, by the PCF device and based on the encryption key, the policy information to generate encrypted policy information; and
   sending, by the PCF device and for the UE, a UE policy message indicating the integrity data, the encrypted policy information, and the identifier of the PCF device.

2. The method of claim 1, wherein the UE is associated with a master session key, and
   wherein the PCF device key uniquely associated with the UE is derived from the master session key associated with the UE.

3. The method of claim 1, wherein the integrity data is a message authentication code (MAC).

4. The method of claim 1, wherein the policy information is UE route selection policy (URSP) information associated with the UE.

5. The method of claim 1, wherein the UE policy message is sent to an access and mobility management function (AMF) device.

6. The method of claim 1, wherein the PCF device key is received from an authentication server function (AUSF) device.

7. The method of claim 1, wherein the PCF device is an authorized PCF device associated with the UE.

8. A user equipment (UE), comprising:
   one or more processors configured to:
   receive a UE policy message indicating first integrity data, encrypted policy information related to the UE, and an identifier of a policy control function (PCF) device,
      wherein the UE is associated with a master session key;
   generate, based on the master session key and the identifier of the PCF device, a PCF device key uniquely associated with the UE;
   generate, based on the PCF device key and the identifier of the PCF device, an integrity key and an encryption key;
   generate, based on the integrity key, second integrity data;
   compare the first integrity data and the second integrity data to determine whether the first integrity data matches the second integrity data;
   decrypt, based on determining that the first integrity data matches the second integrity data and by using the encryption key, the encrypted policy information to generate decrypted policy information associated with the UE; and
   apply the decrypted policy information to outgoing traffic associated with the UE.

9. The UE of claim 8, wherein the UE policy message is associated with an application executing on the UE.

10. The UE of claim 8, wherein the one or more processors are further configured to:
    send the outgoing traffic over a packet data unit (PDU) session based on the decrypted policy information.

11. The UE of claim 8, wherein the encrypted policy information is encrypted UE route selection policy (URSP) information associated with the UE, and
    wherein the decrypted policy information is decrypted URSP information associated with the UE.

12. The UE of claim 8, wherein the first integrity data and the second integrity data are associated with a message authentication code (MAC).

13. The UE of claim 8, wherein the PCF device is an authorized PCF device associated with the UE.

14. A non-transitory computer-readable medium storing a set of instructions, the set of instructions comprising:
    one or more instructions that, when executed by one or more processors of a policy control function (PCF) device, cause the PCF device to:
    receive a PCF device key uniquely associated with a user equipment (UE);
    generate an integrity key and an encryption key based on the PCF device key and an identifier of the PCF device;
    generate, based on the integrity key, integrity data associated with policy information related to the UE;
    encrypt, based on the encryption key, the policy information to generate encrypted policy information; and
    send, for the UE, a UE policy message indicating the integrity data, the encrypted policy information, and the identifier of the PCF device.

15. The non-transitory computer-readable medium of claim 14, wherein the UE is associated with a master session key, and
    wherein the PCF device key uniquely associated with the UE is derived from the master session key associated with the UE.

16. The non-transitory computer-readable medium of claim 14, wherein the integrity data is a message authentication code (MAC).

17. The non-transitory computer-readable medium of claim 14, wherein the policy information is UE route selection policy (URSP) information associated with the UE.

18. The non-transitory computer-readable medium of claim 14, wherein the UE policy message is sent to an access and mobility management function (AMF) device.

19. The non-transitory computer-readable medium of claim 14, wherein the PCF device key is received from an authentication server function (AUSF) device.

20. The non-transitory computer-readable medium of claim 14, wherein the PCF device is an authorized PCF device associated with the UE.

\* \* \* \* \*